(12) United States Patent
Aue et al.

(10) Patent No.: US 9,843,180 B2
(45) Date of Patent: Dec. 12, 2017

(54) END CLOSURE FOR A CABLE AND METHOD FOR ITS MANUFACTURE

(71) Applicant: NEXANS, Paris (FR)

(72) Inventors: Volker Aue, Dortmund (DE); Eduard Schramm, Hannover (DE); Michael Sturmer, Lohne (DE)

(73) Assignee: NEXANS (FR)

( * ) Notice: Subject to any disclaimer, the term of this patent is extended or adjusted under 35 U.S.C. 154(b) by 0 days.

(21) Appl. No.: 15/192,008

(22) Filed: Jun. 24, 2016

(65) Prior Publication Data

US 2016/0380421 A1    Dec. 29, 2016

(30) Foreign Application Priority Data

Jun. 29, 2015   (EP) .................................. 15306027

(51) Int. Cl.
| | | |
|---|---|---|
| *H02G 15/04* | (2006.01) | |
| *H01R 13/20* | (2006.01) | |
| *H01R 4/22* | (2006.01) | |
| *H02G 15/00* | (2006.01) | |
| *G02B 6/44* | (2006.01) | |
| *G02B 6/38* | (2006.01) | |

(52) U.S. Cl.
CPC .......... *H02G 15/04* (2013.01); *G02B 6/4417* (2013.01); *H01R 4/22* (2013.01); *H01R 13/20* (2013.01); *H02G 15/00* (2013.01); *G02B 6/3817* (2013.01); *G02B 6/4427* (2013.01); *G02B 6/4471* (2013.01)

(58) Field of Classification Search
CPC .......... H02G 15/04; H02G 15/00; G02B 6/36; G02B 6/4417; H01R 4/22; H01R 13/20
USPC .................................................. 174/77 R, 91
See application file for complete search history.

(56) References Cited

U.S. PATENT DOCUMENTS

| | | | | |
|---|---|---|---|---|
| 5,807,026 | A * | 9/1998 | Valette ................. | G02B 6/4465 254/134.5 |
| 8,757,892 | B1 * | 6/2014 | Allen ................... | G02B 6/3816 385/59 |
| 2002/0124658 | A1 * | 9/2002 | Schmidt ............... | G01F 23/268 73/856 |
| 2006/0269194 | A1 * | 11/2006 | Luther ................. | G02B 6/3863 385/78 |
| 2011/0083321 | A1 | 4/2011 | Pichler | |
| 2012/0263420 | A1 * | 10/2012 | Benton ................ | G02B 6/3816 385/77 |

OTHER PUBLICATIONS

Search Report dated 2015.

* cited by examiner

*Primary Examiner* — Timothy Thompson
*Assistant Examiner* — Charles Pizzuto
(74) *Attorney, Agent, or Firm* — Sofer & Haroun, LLP

(57) ABSTRACT

An end closure for a cable having a core, at least two electrical cable wires and at least one optical transmission element, the core is surrounded by a metal wire reinforcement. On the end of the electrical cable wires an electrically suitable connection set is mounted, which at least partially protrudes out of a pipe. A connection unit is mounted on the end of the optical transmission element, which also partially protrudes from the pipe. The connection unit has a pot shaped tension element mounted tension proof on the free end of the pipe and surrounds, moisture tight and pressure tight, the part of the connection set and the connection unit that protrudes out of the pipe.

5 Claims, 3 Drawing Sheets

END CLOSURE FOR A CABLE AND METHOD FOR ITS MANUFACTURE

RELATED APPLICATION

This application claims the benefit of priority from European Patent Application. No. 15 306 027.2, filed on Jun. 29, 2015, the entirety of which is incorporated by reference.

BACKGROUND

Field of the Invention

The invention relates to an end closure for a cable, that in a core has at least two electrical cable wires for the transmission of electrical energy and having at least one optical transmission element and its core is surrounded by a reinforcement composed of metal wires, as well as a method for its manufacture.

Description of Related Art

Cable with such an end closure are, for example, important when the cable end is fixed in a predetermined location in the mounted position. That is the case, for example, in wind power plants which stand in off shore locations in the ocean. Such plants have a platform with a height of, for example, 20 m to 50 m above the sea bottom on which are arranged, among other devices and aggregates, for example, transformers and switching plants. A corresponding cable should be laid down as simply as possible up to such a platform and, at the same time, secured on the platform. The transmission elements of the cable can then be relatively easily further connected with the known technology.

An installation method for such a cable is described in EP 2 696 123 A1. With this known method the cable will be provided at its installation place on its end with a cable grip and by means of a tension element engaging the same, is pulled through a pre-mounted pipe up to a platform of a wind power plant on which, by means of a cable grip, it is secured. There is no information in print over the construction of the cable ends and especially one on the same attached end closures.

OBJECTS AND SUMMARY

The invention is based on the object that the previously described end closure is so shaped that the same equipped cable can be mounted without problem to the platform of a wind power plant and that the transmission elements of the cable in the mounted position can simply in this manner be connected further.

The object is met in accordance with the invention in
that the metal wires of the reinforcement on the end of the cables are distanced a predetermined length,
that the end of the core of the cable is surrounded by a tension proof pipe that is connected tension proof to the remaining reinforcement,
that, on the end of the electrical cable wires, to directly connect electrical couplings, the electrically suitable connection set is mounted, which at least partially protrudes out of the pipe,
that a connection unit, one equipped with a part of a plug connector is mounted on the end of the optical transmission element, which also partially protrudes from the pipe,
that a pot shaped tension element, mounted tension proof on the free end of the pipe, surrounds moisture tight and pressure tight the part of the connection set and the connection unit that protrudes out of the pipe.

The cable with this end closure is so assembled that the transmission element at the mounting location can be electrically or optically conductively connected with the existing plant there without essentially additional expenses. At the same time, advantageously plug connections can be used, but also screw and/or clamp connections.

The connection sets are advantageously constructed tension proof. They contain advantageously all the electrical components required for a trouble free transmission from cable or from the cable wires to the electrical devices, such as transformers or switching gears. The electrically conductive connection can be constructed through couplings, also called "close couplers," which on one side, a lead runs out from the connection set guided to the contact element and, on the other side, is connected to each existing device on the platform.

The connection unit for the optical transmission element can perform as a simple plug connector for only a fiber optical cable or also perform as a distributor when the transmission element is connected to two or more fiber optic cables.

The connection sets are advantageously so supported in the pipe that they cannot move in the radial direction. As a result, their positions are fixed so that a nearly automatic viable contact is possible.

The connection unit is advantageously in the initial state mounted on the upper half of the connection set. The diameter of the pipes and the tension element can thereby be kept small. Advantageously, the unit is fixed rotatably on an axis in the pipe, so that for contacting it can be rotated into a suitable position.

A cable, one provided with such an end closure, can in a simple manner, for example, be already pre-assembled in the manufacturing plant, and so be completed tension free that at the installation location or mounting location, without additional connections, it can be fixedly attached to a platform. It can also be completely constructed, for example, on a spool to be transported to the mounting location. The described construction can also alternatively first, complete the connection of the cable at the installation location. The completely constructed transmission element of the cables can be directly connected on the platform to the existing electrical plant after distancing the tension elements.

The connection between the pipe and the reinforcement on one side, as well as between the tension element and the pipe on the other side, is carried out in a moisture proof manner, so that the whole end of the cable is enclosed moisture proof and tension proof.

The pipe surrounding the cable with its core can advantageously be on the outside equipped with parts of a securing device, with which corresponding parts of the securing device attached on the platform, can engage. The laying down of the ends of the cables on the platform is as a result, especially simple. It can be essentially carried out without additional installation effort to the same work step after the lifting of the cables.

BRIEF DESCRIPTION OF THE DRAWINGS

An embodiment of the subject matter of the invention is illustrated in the drawings.

In the drawings.

DETAILED DESCRIPTION

With 1, the lower end of the foundation of a wind power plant is illustrated, that is erected on a sea bottom 2 in the so-called "off-shore area." The foundation 1 has a platform 3 which is found, for example, about 30 m above the sea bottom. On the platform 3 can be arranged a transformer and a switching plant as well as other electrical devices, which are not illustrated here. They are particularly electrically connected on the point of the wind power plant mounted generator.

Through the platform 3 protrudes the end of the cable 4, which lies on the sea bottom 2 and is pulled up to the platform 3. The cable 4 with its free end, for example, can be guided up to another wind power plant or to a transformer station.

Figure 2:
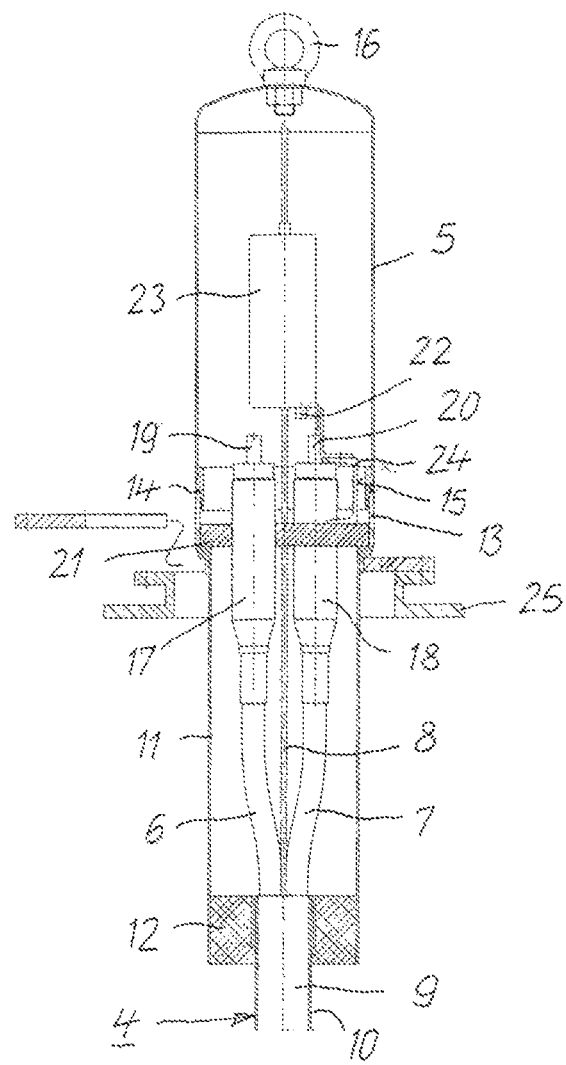
FIG. 2 is an embodiment of the end closures according to the invention in sections.

The cable 4 according to FIG. 2 is also provided with an end closure to which a pot shaped tension element 5 belongs. The emerging end closure in FIG. 2 would already be completed in the manufacturing plant in which the cable 4 is manufactured. That can also be carried out at the installation location before the laying of the cables.

Figure 1:
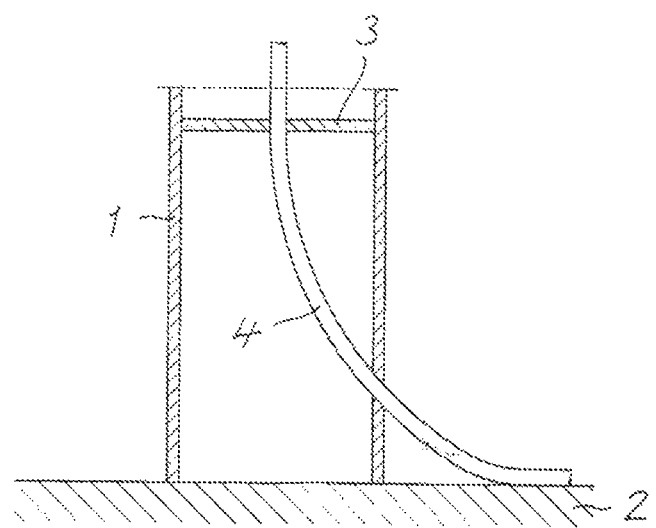
FIG. 1 shows schematically the lower end of the foundation of a wind power plant.

In a core of the cable 4 in the illustrated embodiment are two cable wires 6 and 7, available for transmission of electrical energy and optical transmission element 8. The transmission element 8 is composed of at least one fiber optic cable. More fiber optic cables are preferable. The cable wires 6 and 7 as well as transmission element 8 are surrounded by a common cover 9 composed of insulation material, over which a reinforcement 10 is mounted composed of metal wires, preferably of high grade steel. The cover 9 and the reinforcement 10 are distanced from the end of the cable 4 in FIG. 1, so that the cable wires 6 and 7 and the transmission element 8 are freely accessible.

The cable wires 6 and 7 as well as the transmission element 8 are surrounded by a tension proof pipe 11, out of which in the mounted position, it protrudes from an end of the pipe. The pipe 11, preferably composed of high grade steel, is connected tension proof at the other end with the reinforcement 10. The contact point between the pipe 11 and the reinforcement 10 is indicated by a crosshatched box 12. Such connections are known and therefore not shown in more detail.

On the free end of the pipe 11, from which the cable wires 6 and 7 and the transmission element 8 protrude, is fastened tension free the pot shaped tension element 5. This can be carried out with a pipe 11 welded with a pipe piece 13 and in the same for example with a screw connection 14 fixed ring 15, with which the tension element 5 is welded to. The tension element 5 has a drawbar 16 on its free end.

On both the cable wires 6 and 7 is mounted each a fixed voltage connection set 17 or 18, in which each of the electrical conductors of the corresponding cable wire protrudes, and all the electrical components are contained therein which are required for a cable wire closure. On the free end of the connection set 17 and 18 protrudes a contact element 19 or 20 for electrical connections from counter contacts, for example from couplings which serve for the electrically conductive connections with the available electrical devices on the platform 3. The connection sets 17 and 18 are advantageously arranged in a holding plate 21 composed of insulation material, which rests against the inside of the pipe piece 13. As a result, they are supported in the radial direction.

Figure 3:
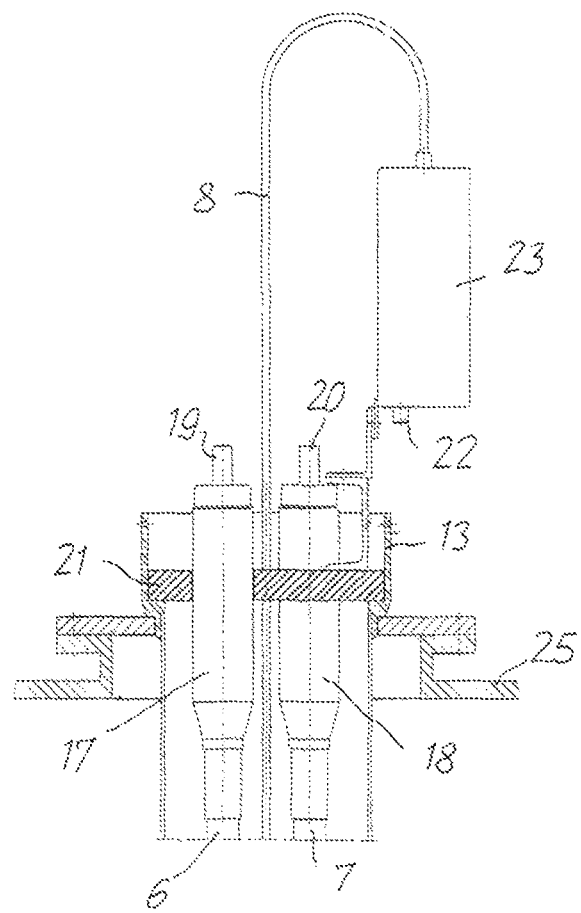
FIG. 3 shows and end closure without tension element.

On the end of the optical transmission element 8 is attached a part 22 of a connection unit 23 equipped with a plug connection, which serves to connect continuing optical transmission elements. The connection unit 23 is, corresponding to FIG. 2, advantageously arranged in the axial direction on the upper half of the connection sets 17 and 18, so that the clear dimensions of the tension elements 5 in the radial direction can be kept small. They correspond to those of pipe 11. The connection unit 23 is advantageously secured on a holder 24 with a turning point, around which the axis, seen in a visible position in FIG. 3, can be turned or pivoted.

Outside on the pipe 11 can be mounted the part 25, a fastening device with which to secure the end closures on the platform 3 by engaging with a corresponding part for the fastening device.

The end closure according to the invention is manufactured and handled, for example; as follows:

The reinforcement 10 and the cover 9 are distanced a predetermined length from the end of the cable 4. On the ends of the cable wires 6 and 7 are mounted the connection sets 17 and 18. Subsequently, the pipe 11 is pushed over the end of the cable 4, and on the bottom end, connected tension free with the remaining reinforcement 10, for example, by welding. On the free end of the pipe 11 the pipe piece 13 would be mounted tension free, and again advantageously, through welding.

After, the connection sets 17 and 18 can, for example, be guided through by boring the support plate 21, which can be secured after that in the pipe piece 13.

After that, the optical connection unit 23 is mounted on the end of the optical transmission element 8 and secured on the holder 24. The ring 15 is then screwed together with the pipe piece 13. Subsequently, the tension element 5 is provided, and tension free connected with the ring 15, preferably through welding. Also, the ring 15 can already be secured on the tension element before being screwed together with the pipe piece 13.

With the so completed end closure, the cable 4 can be pulled up to the platform 3 and secured to, or on, the platform. The tension element 5 can then together with the ring 15 be taken off through the loosening of the screw connection 14 from the pipe 11.

The connection sets 17 and 18, as well as the connection unit 23, are available to use the transmission paths for a direct through connection. The connection unit 23 would be suitable for that in the apparent turned position in FIG. 3, so that the contact elements 19 and 20 are more accessible to the connection sets 17 and 18.

The invention claimed is:

1. End closure for a cable, the cable having a core that has at least two electrical cable wires for the transmission of electrical energy and having at least one optical transmission element, said end closure comprising:

a reinforcement composed of metal wires surrounding the core, wherein the metal wires of the reinforcement on an end of the cable are distanced a predetermined length, an end of the core of the cable is surrounded by a tension proof pipe that is connected tension proof with the remaining reinforcement, on an end of the electrical cable wires, to directly connect electrical couplings, an electrically suitable connection set is mounted, which at least partially protrudes out of the pipe, a connection unit, one equipped with a part of a plug connector, is mounted on an end of the optical transmission element, which also partially protrudes from the pipe, where the connection unit is fastened in, and rotatably attached to, a holder that has a turning point, around which the holder can be turned or pivoted; and a pot shaped tension element mounted tension proof on a free end of the pipe, surrounds, moisture tight and pressure tight, a part of the connection set and the connection unit that protrudes out of the pipe.

2. End closure according to claim 1, wherein the tension proof connection between the pipe and the reinforcement on one side, as between the tension element and the pipe on the other side, is carried out moisture proof and pressure tight.

3. End closure according to claim 1, wherein the connection sets are supported in a radial direction in the pipe.

4. End closure according to claim 1, wherein, on an outside of the pipe, is mounted a part, a fastening device for securing the pipe to a fixed plant.

5. End closure according to claim 1, wherein on a free end of the tension element a drawbar is mounted.

\* \* \* \* \*